United States Patent
Lee et al.

(10) Patent No.: US 9,702,437 B2
(45) Date of Patent: *Jul. 11, 2017

(54) POWER TRANSMISSION SYSTEM OF HYBRID ELECTRIC VEHICLE

(71) Applicant: Hyundai Motor Company, Seoul (KR)

(72) Inventors: Chang Wook Lee, Suwon-si (KR); Kangsoo Seo, Yongin-si (KR); Jae Chang Kook, Hwaseong-si (KR); Jongsool Park, Hwaseong-si (KR); Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 91 days.

This patent is subject to a terminal disclaimer.

(21) Appl. No.: 14/500,572

(22) Filed: Sep. 29, 2014

(65) Prior Publication Data

US 2015/0148170 A1    May 28, 2015

(30) Foreign Application Priority Data

Nov. 22, 2013 (KR) .................... 10-2013-0143255

(51) Int. Cl.
*F16H 3/46* (2006.01)
*B60K 6/387* (2007.10)
(Continued)

(52) U.S. Cl.
CPC ............... *F16H 3/46* (2013.01); *B60K 6/365* (2013.01); *B60K 6/387* (2013.01); *B60K 6/445* (2013.01);
(Continued)

(58) Field of Classification Search
CPC ......... Y10S 903/911; F16H 2200/0043; F16H 2200/2038; F16H 2200/2007; B60K 6/365; B60K 2006/4808; B60K 2006/4825

See application file for complete search history.

(56) References Cited

U.S. PATENT DOCUMENTS 8,226,515 B2    7/2012 Phillips
8,905,882 B2 *  12/2014 Lee .................. B60K 6/365
                                                180/65.26
(Continued)

FOREIGN PATENT DOCUMENTS

JP          4007403 B1    11/2007
JP      2010-162969 A     7/2010
(Continued)

*Primary Examiner* — Stacey Fluhart
(74) *Attorney, Agent, or Firm* — Morgan, Lewis & Bockius LLP

(57) ABSTRACT

A power transmission system of a hybrid electric vehicle which uses an engine and first and second motor/generators as power sources may include an input shaft receiving torque of the engine, an intermediate shaft parallel with and apart from the input shaft, an output shaft relatively rotatable with respect to the intermediate shaft, a first planetary gear set including a first rotation element, a second rotation element, and a third rotation element, a second planetary gear set including a fourth rotation element, a fifth rotation element, and a sixth rotation element, a first transfer gear connecting the second rotation element with the output shaft, a second transfer gear connecting the input shaft or the first rotation element with the sixth rotation element, and a first clutch selectively connecting two rotation elements among three rotation elements of the second planetary gear set.

13 Claims, 15 Drawing Sheets

(51) Int. Cl.
*B60K 6/445* (2007.10)
*B60K 6/365* (2007.10)
*B60K 6/547* (2007.10)
*F16H 3/72* (2006.01)
*F16H 3/66* (2006.01)
*B60K 6/48* (2007.10)

(52) U.S. Cl.
CPC .............. *B60K 6/547* (2013.01); *F16H 3/66* (2013.01); *F16H 3/728* (2013.01); *B60K 2006/4808* (2013.01); *F16H 2200/0043* (2013.01); *F16H 2200/2007* (2013.01); *F16H 2200/2041* (2013.01); *Y02T 10/6239* (2013.01); *Y10S 903/902* (2013.01)

(56) References Cited

U.S. PATENT DOCUMENTS

| | | | | |
|---|---|---|---|---|
| 2003/0166429 | A1* | 9/2003 | Tumback | B60K 6/445 475/5 |
| 2010/0216584 | A1* | 8/2010 | Lutoslawski | B60K 6/365 475/5 |
| 2013/0023368 | A1* | 1/2013 | Tamai | B60K 6/365 475/5 |

FOREIGN PATENT DOCUMENTS

| | | |
|---|---|---|
| JP | 2013-001385 A | 1/2013 |
| KR | 10-2011-0131938 A | 12/2011 |

\* cited by examiner

FIG. 2

| mode | sub-mode | friction element | | | |
|---|---|---|---|---|---|
| | | CL1 | CL2 | CL3 | BK1 |
| EV mode | 1ST | | | | ● |
| | 2ND | ● | | | |
| | quick acceleration mode | | | ● | ● |
| HEV input split mode | 1ST | | | | ● |
| | 2ND | ● | | | |
| HEV compound split mode | 1ST | | ● | | |
| | 2ND | | | ● | |
| engine mode | 1ST | ● | | ● | |
| | 2ND | | ● | | ● |
| | 3RD | | ● | ● | |
| | 4TH | ● | ● | | |

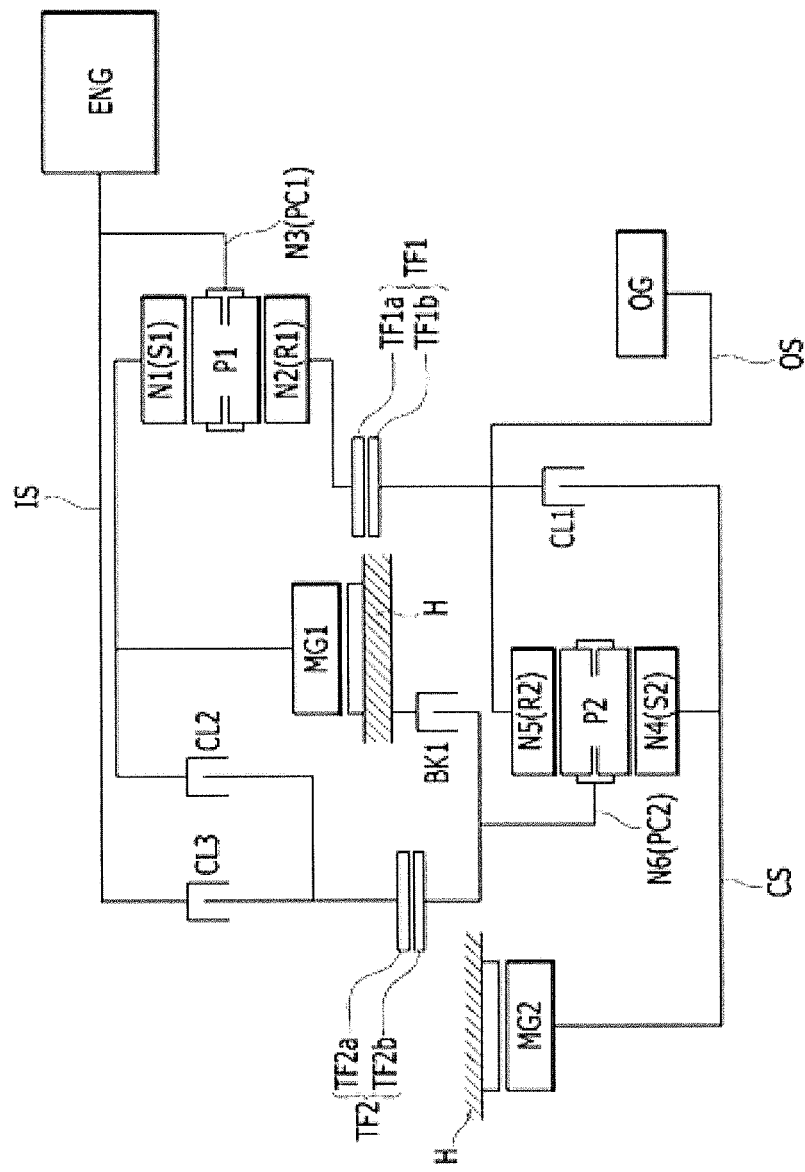

POWER TRANSMISSION SYSTEM OF HYBRID ELECTRIC VEHICLE

CROSS-REFERENCE TO RELATED APPLICATION

The present application claims priority to Korean Patent Application No. 10-2013-0143255 filed Nov. 22, 2013, the entire contents of which is incorporated herein for all purposes by this reference.

BACKGROUND OF THE INVENTION

Field of the Invention

The present invention relates to a power transmission system of a hybrid electric vehicle. More particularly, the present invention relates to a power transmission system of a hybrid electric vehicle which minimizes impact due to torque change of a motor/generator when being converted into a hybrid operating mode and reduces electric load and capacity of the motor/generator by giving more importance to mechanical power delivery path when splitting engine power.

Description of Related Art

Environmentally-friendly technique of vehicles is a very important technique on which survival of future motor industry is dependent. Vehicle makers are focusing on development of environmentally-friendly vehicles so as to meet environment and fuel consumption regulations.

Therefore, the vehicle makers have been developing future vehicles such as electric vehicles (EV), hybrid electric vehicles (HEV), and fuel cell electric vehicles (FCEV).

Since the future vehicles have technical restrictions such as weight and cost, the vehicle makers keep observation upon hybrid electric vehicles for meeting exhaust gas regulations and improving fuel consumption performance and are competing desperately to put the hybrid electric vehicles to practical use.

The hybrid electric vehicles are vehicles using more than two power source, and gasoline engines or diesel engines using fossil fuel and motor/generators driven by electrical energy are mainly used as the power source of the hybrid electric vehicles.

The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle.

Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The power transmission system of the multi-mode type has different operating mechanisms depending on connections of the planetary gear sets, the motor/generators, and the torque delivery apparatus.

In addition, the power transmission system of the multi-mode type has different features such a durability, power delivery efficiency, and size depending on the connections of the planetary gear sets, the motor/generators, and the torque delivery apparatus. Therefore, designs for the connection structure of the power transmission system of a hybrid electric vehicle are also under continuous investigation to achieve robust designs and compact power transmission system having no power loss.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a hybrid electric vehicle having advantages of minimizing impact due to torque change of a motor/generator when being converted into a hybrid operating mode and reducing electric load and capacity of the motor/generator by giving more importance on mechanical power delivery path when splitting engine power.

In addition, various aspects of the present invention are directed to providing a power transmission system of a hybrid electric vehicle having further advantages of providing engine modes where a vehicle runs without consuming electric energy at the motor/generator for enhancement of fuel consumption when high-speed traveling.

According to various aspects of the present invention, a power transmission system of a hybrid electric vehicle which uses an engine and first and second motor/generators as power sources may include an input shaft connected to and receiving torque of the engine, an intermediate shaft disposed in parallel with and apart from the input shaft, an output shaft disposed in parallel to and relatively rotatable with respect to the intermediate shaft, a first planetary gear set including a first rotation element connected to the first motor/generator, a second rotation element connected to the output shaft, and a third rotation element directly connected to the input shaft, a second planetary gear set including a fourth rotation element connected to the second motor/generator through the intermediate shaft, a fifth rotation element directly connected to the output shaft, and a sixth rotation element selectively connected to the input shaft or the first rotation element or selectively connected to a transmission housing, a first transfer gear connecting the second rotation element with the output shaft, a second transfer gear connecting the input shaft or the first rotation element with the sixth rotation element, and a first clutch selectively connecting two rotation elements among three rotation elements of the second planetary gear set.

The first planetary gear set may be a single pinion planetary gear set and include a first sun gear being first rotation element, a first planet carrier being the second rotation element, and a first ring gear being the third rotation element, and the second planetary gear set may be a single pinion planetary gear set and include a second sun gear being the fourth rotation element, a second planet carrier being the fifth rotation element, and a second ring gear being the sixth rotation element.

The first planetary gear set may be a double pinion planetary gear set and include a first sun gear being the first rotation element, a first ring gear being the second rotation element, and a first planet carrier being the third rotation element, and the second planetary gear set may be a single pinion planetary gear set and include a second sun gear being the fourth rotation element, a second planet carrier being the fifth rotation element, and a second ring gear being the sixth rotation element.

The first planetary gear set may be a double pinion planetary gear set and include a first sun gear being the first rotation element, a first ring gear being the second rotation element, and a first planet carrier being the third rotation element, and the second planetary gear set may be a double pinion planetary gear set and include a second sun gear being the fourth rotation element, a second ring gear being the fifth rotation element, and a second planet carrier being the sixth rotation element.

The power transmission system may further include a second clutch selectively connecting the first rotation element with the second transfer gear, a third clutch selectively connecting the input shaft with the second transfer gear, and a first brake selectively connecting the sixth rotation element with the transmission housing.

The first brake may be operated at a first electric vehicle (EV) mode, the first clutch may be operated at a second EV mode, the third clutch and the first brake may be operated at a quick acceleration mode of an EV mode, the first brake may be operated at a first hybrid electric vehicle (HEV) input split mode, the first clutch may be operated at a second HEV input split mode, the second clutch may be operated at a first HEV compound split mode, the third clutch may be operated at a second HEV compound split mode, the first clutch and the third clutch may be operated at a first engine mode, the second clutch and the first brake may be operated at a second engine mode, the second clutch and the third clutch may be operated at a third engine mode, and the first clutch and the second clutch may be operated at a fourth engine mode.

According to another aspect of the present invention, the power transmission system may include a first planetary gear set including a first rotation element connected to the first motor/generator, a second rotation element connected to an output gear, and a third rotation element connected to the engine, a second planetary gear set including a fourth rotation element connected to the second motor/generator, a fifth rotation element connected to the output gear, and a sixth rotation element selectively connected to the input shaft or the first rotation element or selectively connected to a transmission housing, a first transfer gear connecting the second rotation element with the output gear, a second transfer gear connecting the input shaft or the first rotation element to the sixth rotation element, a first clutch adapted to selectively direct-couple the second planetary gear set, a second clutch selectively connecting the first rotation element with the second transfer gear, a third clutch selectively connecting the input shaft with the second transfer gear; and a first brake selectively connecting the sixth rotation element with the transmission housing.

The first planetary gear set may be a single pinion planetary gear set and include a first sun gear being first rotation element, a first planet carrier being the second rotation element, and a first ring gear being the third rotation element, and the second planetary gear set may be a single pinion planetary gear set and include a second sun gear being the fourth rotation element, a second planet carrier being the fifth rotation element, and a second ring gear being the sixth rotation element.

The first planetary gear set may be a double pinion planetary gear set and include a first sun gear being the first rotation element, a first ring gear being the second rotation element, and a first planet carrier being the third rotation element, and the second planetary gear set may be a single pinion planetary gear set and include a second sun gear being the fourth rotation element, a second planet carrier being the fifth rotation element, and a second ring gear being the sixth rotation element.

The first planetary gear set may be a double pinion planetary gear set and include a first sun gear being the first rotation element, a first ring gear being the second rotation element, and a first planet carrier being the third rotation element, and the second planetary gear set may be a double pinion planetary gear set and include a second sun gear being the fourth rotation element, a second ring gear being the fifth rotation element, and a second planet carrier being the sixth rotation element.

The first clutch may be interposed between the fourth rotation element and the fifth rotation element.

The first clutch may be interposed between the fourth rotation element and the sixth rotation element.

The first clutch may be interposed between the fifth rotation element and the sixth rotation element.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of frictional elements at each mode applied to an exemplary power transmission system according to the present invention.

FIG. 7 is a schematic diagram of an exemplary power transmission system according to the present invention.

Figure 1:
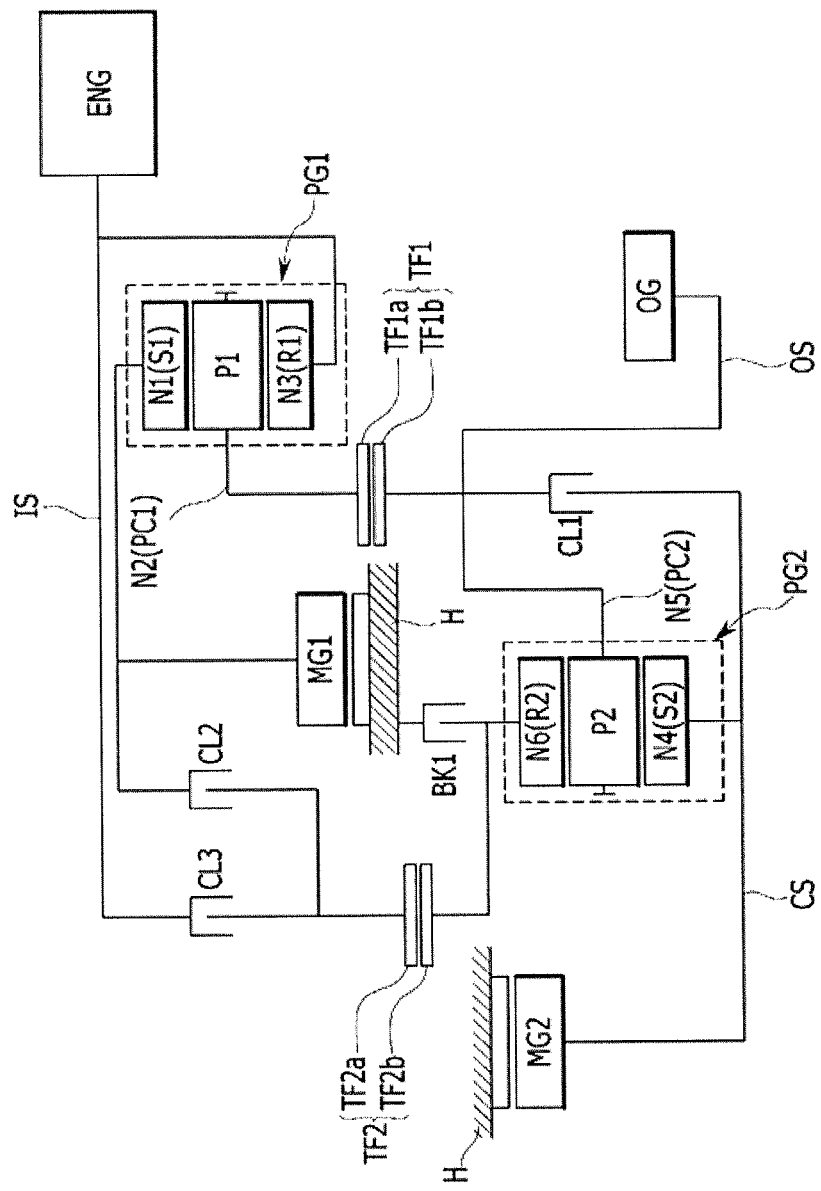
FIG. 1 is a schematic diagram of an exemplary power transmission system according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining various exemplary embodiments will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmission system according to various embodiments of the present invention.

Referring to FIG. 1, a power transmission system of a hybrid electric vehicle according to various embodiments of the present invention changes torque of an engine ENG transmitted through an input shaft IS according to a running state of a vehicle, and outputs the changed torque through an output gear OG.

The power transmission system includes the input shaft IS, an intermediate shaft CS, an output shaft OS, first and second planetary gear sets PG1 and PG2, first and second motor/generators MG1 and MG2, a direct-coupling device including a first clutch CL1, and a selectively connecting device including second and third clutches CL2 and CL3 and a first brake BK1.

The input shaft IS is an input member which is connected to an output side of the engine and receives torque of the engine. The first planetary gear set PG1 and the first motor/generator MG1 are disposed on the input shaft IS.

The intermediate shaft CS is disposed in parallel with and apart from the input shaft IS, and the second planetary gear set PG2 and the second motor/generator MG2 are disposed on the intermediate shaft CS.

The output shaft OS is disposed close to and in parallel with the intermediate shaft CS and an output gear OG is fixedly disposed on the output shaft OS.

The first planetary gear set PG1 includes first, second, and third rotation elements N1, N2, and N3 and is disposed on the input shaft IS. The second planetary gear set PG2 includes fourth, fifth, and sixth rotation elements N4, N5, and N6 and is disposed on the intermediate shaft CS.

The first rotation element N1 is directly connected to the first motor/generator MG1, the second rotation element N2 is connected to the output shaft OS through a first transfer gear TF1, and the third rotation element N3 is directly connected to the input shaft IS.

The fourth rotation element N4 is connected to the second motor/generator MG2 through the intermediate shaft CS, the fifth rotation element N5 is directly connected to the output shaft OS and is selectively connected to the fourth rotation element N4, and the sixth rotation element N6 is selectively connected to the input shaft IS or the first rotation element N1 through a second transfer gear TF2 or is selectively connected to a transmission housing H.

The first and second transfer gears TF1 and TF2 respectively have first and second transfer drive gears TF1a and TF2a and first and second transfer driven gears TF1b and TF2b externally meshed with each other.

The first transfer drive gear TF1a is connected to the second rotation element N2, and the first transfer driven gear TF1b engaged with the first transfer drive gear TF1a is connected to the output shaft OS.

The second transfer drive gear TF2a is selectively connected to the input shaft IS or the first rotation element N1, and the second transfer driven gear TF2b engaged with the second transfer drive gear TF2a is connected to the sixth rotation element N6.

In addition, gear ratios of the first transfer gear TF1 and the second transfer gear TF2 may be set according to target speed ratios.

The first motor/generator MG1 and the second motor/generator MG2 are independent power sources and are operated as a motor and a generator.

The first motor/generator MG1 is connected to the first rotation element N1 of the first planetary gear set PG1 so as to be operated as a motor supplying torque to the first rotation element N1 or as a generator generating electric energy by torque of the first rotation element N1.

The second motor/generator MG2 is connected to the fourth rotation element N4 of the second planetary gear set PG2 so as to be operated as a motor supplying torque to the fourth rotation element N4 or as a generator generating electric energy by torque of the fourth rotation element N4.

For this purpose, the first motor/generator MG1 is disposed about and the first planetary gear set PG1 is disposed on the input shaft IS, and the second motor/generator MG2 as well as the second planetary gear set PG2 are deposed on the intermediate shaft CS. In addition, stators of the first motor/generator MG1 and the second motor/generator MG2 are fixed to the transmission housing H, and rotors of the first motor/generator MG1 and the second motor/generator MG2 are connected respectively to the first rotation element N1 and the fourth rotation element N4.

The first clutch CL1 is a direct-coupling device which causes the second planetary gear set PG2 to become a direct-coupling state. For this purpose, the first clutch CL1 selectively connects the fourth rotation element N4 with the fifth rotation element N5.

The second and third clutches CL2 and CL3 and the first brake BK1 are included in the selectively connecting device. The second clutch CL2 selectively connects the first rotation element N1 of the first planetary gear set PG1 with the second transfer drive gear TF2a of the second transfer gear TF2, and the third clutch CL3 selectively connects the input shaft IS and the second transfer drive gear TF2a of the second transfer gear TF2.

In addition, the first brake BK1 selectively connects the sixth rotation element N6 of the second planetary gear set PG2 with the transmission housing H.

The first, second, and third clutches CL1, CL2, and CL3 are frictional elements selectively connecting a rotation element with another rotation element, and the first brake BK1 is a frictional element selectively connecting a rotation element with a fixed element (i.e., transmission housing). The first, second, and third clutches CL1, CL2, and CL3 and the first brake BK1 may be conventional multi-plate friction elements of wet type that are operated by hydraulic pressure.

The power transmission system of a hybrid electric vehicle according to various embodiments of the present invention will be described in further detail.

The first planetary gear set PG1 may be a single pinion planetary gear set, and includes a first sun gear S1 of the first rotation element N1, a first planet carrier PC1 of the second rotation element N2 rotatably supporting a first pinion P1 externally engaged with the first sun gear S1, and a first ring gear R1 of the third rotation element N3 internally engaged with the first pinion P1.

The second planetary gear set PG2 may be a single pinion planetary gear set, and includes a second sun gear S2 of the fourth rotation element N4, a second planet carrier PC2 of the fifth rotation element N5 rotatably supporting a second pinion P2 externally engaged with the second sun gear S2, and a second ring gear R2 of the sixth rotation element N6 internally engaged with the second pinion P2.

The first planetary gear set PG1 is disposed on and the first motor/generator MG1 is disposed about the input shaft IS, and the second planetary gear set PG2 as well as the second motor/generator MG2 is disposed on the intermediate shaft CS disposed in parallel with and apart from the input shaft IS.

The first sun gear S1 is connected to the first motor/generator MG1, the first planet carrier PC1 is connected to the output shaft OS through the first transfer gear TF1, and the first ring gear R1 is directly connected to the input shaft IS.

In addition, the second sun gear S2 is connected to the second motor/generator MG2 through the intermediate shaft CS, the second planet carrier PC2 is directly connected to the output shaft OS and selectively connected to the second sun gear S2, and the second ring gear R2 is selectively connected to the input shaft IS or the first sun gear S1 through the second transfer gear TF2 or is selectively connected to the transmission housing H.

The output gear OG is fixedly disposed on the output shaft OS and transmits torque to a driving wheel through a final reduction gear and a differential apparatus.

The first and second transfer gears TF1 and TF2 respectively have first and second transfer drive gears TF1a and TF2a and first and second transfer driven gear TF1b and TF2b externally meshed with each other.

The first transfer drive gear TF1a is connected to the first planet carrier PC1 and the first transfer driven gear TF1b is connected to the output shaft OS.

The second transfer drive gear TF2a is selectively connected to the input shaft IS or the first sun gear S1 and the second transfer driven gear TF2b is connected to the second ring gear R2.

The first motor/generator MG1 is connected to the first sun gear S1 so as to be operated as the motor supplying torque to the first sun gear S1 or as the generator generating electric energy by torque of the first sun gear S1.

The second motor/generator MG2 is connected to the second sun gear S2 so as to be operated as the motor supplying torque to the second sun gear S2 or as the generator generating electric energy by torque of the second sun gear S2.

For this purpose, the stators of the first motor/generator MG1 and the second motor/generator MG2 are fixed to the transmission housing H, and the rotors of the first motor/generator MG1 and the second motor/generator MG2 are connected respectively to the first sun gear S1 and the second sun gear S2.

The first clutch CL1 selectively connects the second sun gear S2 with the second planet carrier PC2.

The second clutch CL2 is configured to selectively connect the first sun gear S1 with the second transfer gear TF2, and the third clutch CL3 is configured to selectively connect the input shaft IS with the second transfer gear TF2.

In addition, the first brake BK1 is configured to selectively connect the second ring gear R2 to the transmission housing H.

FIG. 2 is an operational chart of frictional elements at each mode applied to a power transmission system according to various embodiments of the present invention.

Referring to FIG. 2, frictional elements operated at each mode will be described.

The first brake BK1 is operated at a first electric vehicle (EV) mode, the first clutch CL1 is operated at a second EV mode, and the third clutch CL3 and the first brake BK1 are operated at a quick acceleration mode of an EV mode.

In addition, the first brake BK1 is operated at a first hybrid electric vehicle (HEV) input split mode, the first clutch CL1 is operated at a second HEV input split mode, the second clutch CL2 is operated at a first HEV compound split mode, and the third clutch CL3 is operated at a second HEV compound split mode.

In addition, the first clutch CL1 and the third clutch CL3 are operated at a first engine mode, the second clutch CL2 and the first brake BK1 are operated at a second engine mode, the second clutch CL2 and the third clutch CL3 are operated at a third engine mode, and the first clutch CL1 and the second clutch CL2 are operated at a fourth engine mode.

The power transmission system according to various embodiments of the present invention can achieve three EV modes, four hybrid modes, and four engine modes.

FIGS. 3A-3C, 4A-4D and 5A-5D are drawings for explaining operation of the power transmission system at each mode according to various embodiments of the present invention. Referring to FIGS. 3A-3C, 4A-4D and 5A-5D, operation of the power transmission system at each mode will be described in detail.

First EV Mode

Figure 3A:
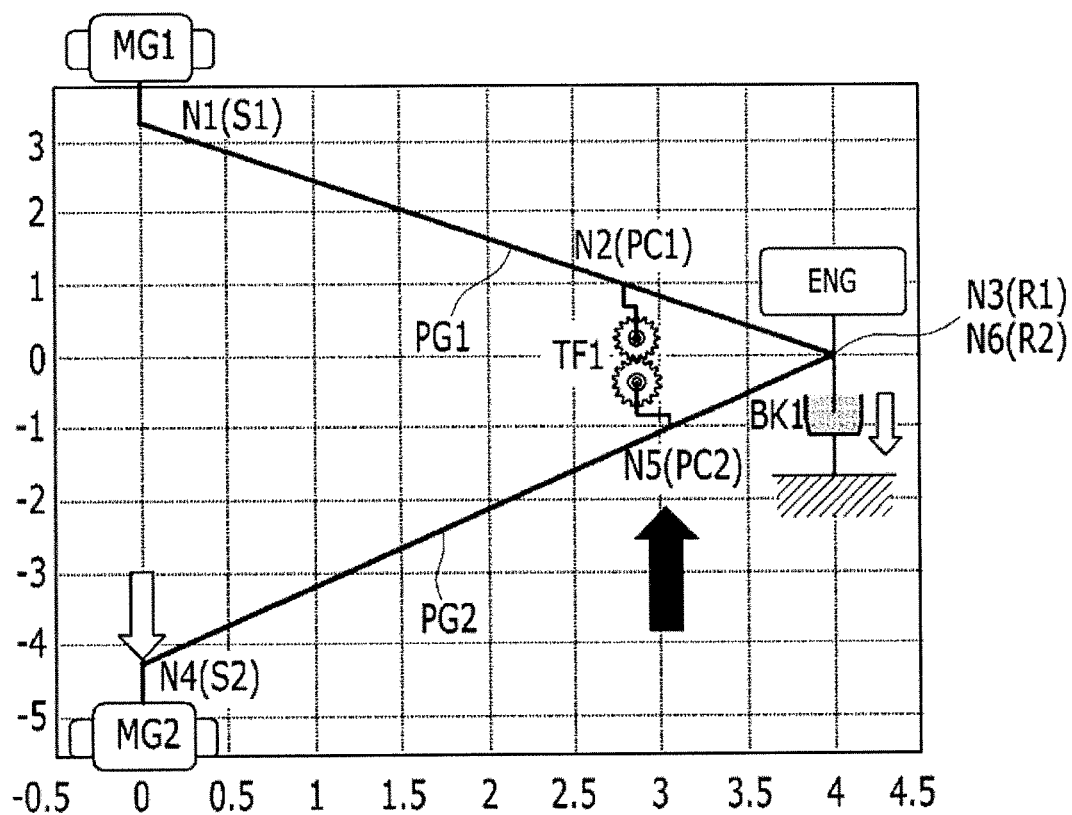
FIG. 3A is a drawing for explaining operation of an exemplary power transmission system at a first electric vehicle (EV) mode according to the present invention.

FIG. 3A is a drawing for explaining operation of a power transmission system at a first electric vehicle (EV) mode according to various embodiments of the present invention.

The EV mode is a mode where power of a battery is supplied to a motor/generator in a stopped state of an engine such that a vehicle is driven by power of the motor/generator.

Since the engine is stopped, fuel economy may be enhanced, and the vehicle can move rearward without an additional reverse speed device at the EV mode. The EV mode is utilized when the vehicle is started in a stopped state or the vehicle runs with a low speed. A reduced gear ratio where the power source rotates faster than an output member is required for assisting hill-start or quick acceleration.

Under such conditions, the sixth rotation element N6 is operated as a fixed element by operation of the first brake BK1, and the second motor/generator MG2 is operated so as to input torque of the second motor/generator MG2 to the fourth rotation element N4 at the first EV mode. Therefore, the torque of the second motor/generator MG2 is changed according to the gear ratio of the second planetary gear set PG2 and the changed torque is output.

At this time, the first planetary gear set PG1 is not involved in a shift. However, the third rotation element N3 is stopped together with the engine and the second rotation element N2 is connected to the fifth rotation element N5 through the first transfer gear TF1. Therefore, the first and second rotation elements N1 and N2 are idling.

Second EV Mode

Figure 3B:
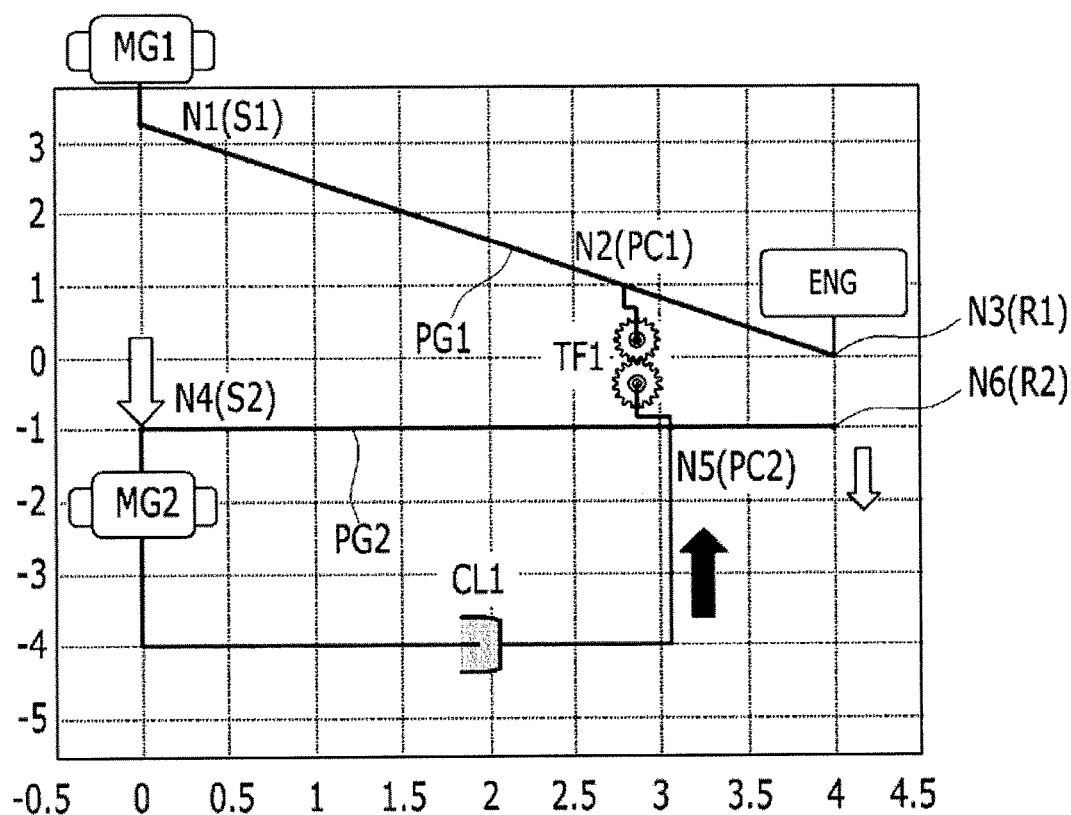
FIG. 3B is a drawing for explaining operation of an exemplary power transmission system at a second EV mode according to the present invention.

FIG. 3B is a drawing for explaining operation of a power transmission system at a second EV mode according to various embodiments of the present invention.

Efficiency of the motor/generator changes according to rotation speed and torque thereof. This means that a conversion ratio of electrical energy into mechanical energy is different according to the rotation speed and the torque of the motor/generator even though the same amount of current is supplied.

Current of the battery used at EV mode is generated by burning fuel in the engine or being accumulated by regenerative braking, but how to use the accumulated energy efficiently affects enhancement of fuel economy directly.

For this reason, a transmission realizing more than two shift-speeds is increasingly mounted on the electric vehicle, and it is advantageous that the hybrid vehicle realizes the EV mode having more than two shift-speeds. Therefore, various embodiments of the present invention can realize the second EV mode.

Shifting processes to the second EV mode are as follows. If vehicle speed increases during the vehicle driving at the first EV mode, efficiency of the second motor/generator MG2 is deteriorated. At this time, if the first brake BK1 is released and the first clutch CL1 is operated at a point where the efficiency of the second motor/generator MG2 is bad, the second EV mode is achieved.

In this case, since the first clutch CL1 that is the direct-coupling device of the second planetary gear set PG2 is operated, the second planetary gear set PG2 becomes a direct-coupling state. Therefore, all the rotation elements N4, N5, and N6 of the second planetary gear set PG2 rotate with the same speed. Therefore, torque input to the second planetary gear set PG2 is output without rotational speed change.

At this time, the first planetary gear set PG1 is not involved in a shift. However, the third rotation element N3 is stopped together with the engine, and the first and second rotation elements N1 and N2 are idling.

Quick Acceleration Mode of EV Mode

Figure 3C:
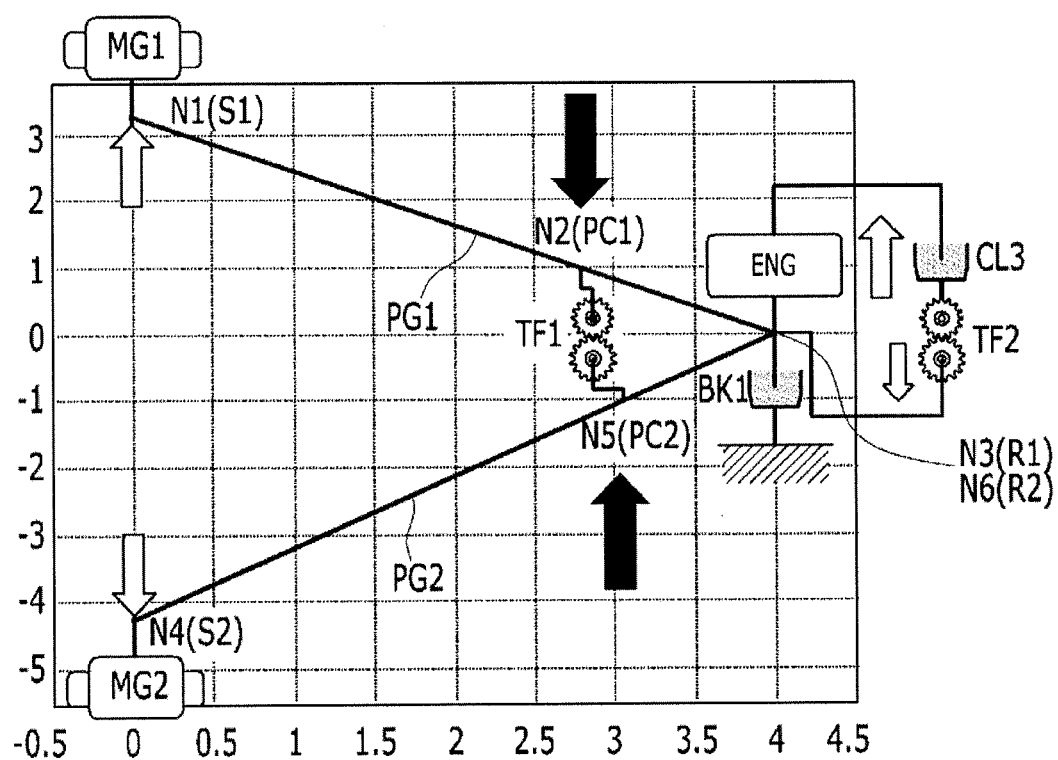
FIG. 3C is a drawing for explaining operation of an exemplary power transmission system at a quick acceleration mode of an EV mode according to the present invention.

FIG. 3C is a drawing for explaining operation of a power transmission system at a quick acceleration mode of an EV mode according to various embodiments of the present invention.

If the driver wants the quick acceleration mode of the EV mode, high driving torque is provided by operating the first and second motor/generators MG1 and MG2 simultaneously.

After the third rotation element N3 and the sixth rotation element N6 are operably connected by operating the third clutch CL3, the first brake BK1 is operated at the quick acceleration mode of the EV mode. In this case, both of the third rotation element N3 and the sixth rotation element N6 are stopped.

At this state, if the first and second motor/generators MG1 and MG2 are simultaneously operated, the torques of the first and second motor/generators MG1 and MG2 are added and the added torque is output through the output gear OG. Therefore, high driving torque may be obtained.

First HEV Input Split Mode

Figure 4A:
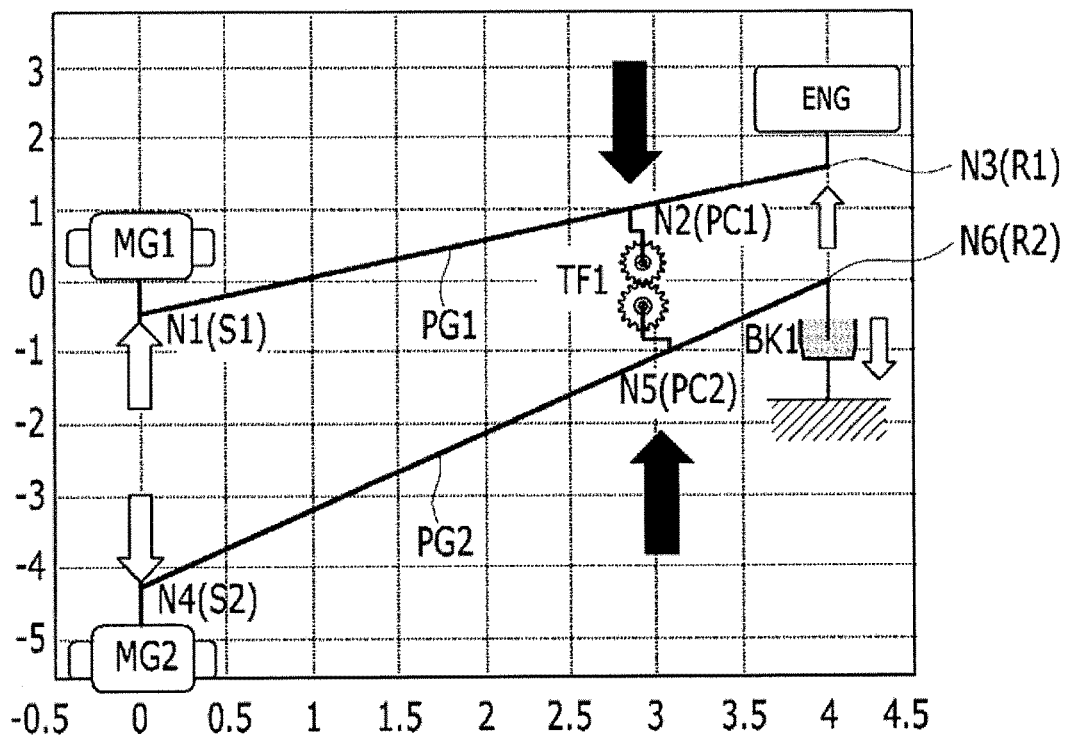
FIG. 4A is a drawing for explaining operation of an exemplary power transmission system at a first hybrid electric vehicle (HEV) input split mode according to the present invention.

FIG. 4A is a drawing for explaining operation of a power transmission system at a first hybrid electric vehicle (HEV) input split mode according to various embodiments of the present invention.

The torque of the engine is delivered to the output member through mechanical path and electrical path at the HEV mode, and such split of the engine torque is done by the planetary gear set. Since the engine and the motor/generator connected to the planetary gear set can control their rotation speeds regardless of the vehicle speed, the power transmission system at the HEV mode is operated as an electric continuously variable transmission.

The speed and the torque of the engine are fixed at a given vehicle speed in a conventional transmission, but the speed and the torque of the engine can be changed freely at the given vehicle speed in the electric continuously variable transmission. Therefore, driving efficiency of the engine may be maximized and fuel economy may be enhanced.

The second rotation element N2 and the fifth rotation element N5 are connected to the output gear OG, but the first and third rotation elements N1 and N3 can rotate freely at the first EV input split mode.

Therefore, if the engine ENG is started by using the first motor/generator MG1, speeds of the engine ENG and the first motor/generator MG1 can be controlled regardless of the vehicle speed.

At this time, since the torque of the first motor/generator MG1 is added to the torque of the engine ENG, high driving torque maybe output.

In addition, the first motor/generator MG1 is operated as the generator if the first motor/generator MG1 rotates in anticlockwise, and the first motor/generator MG1 is operated as the motor if the first motor/generator MG1 rotates in clockwise (at this time, rotation speed of the engine ENG decreases).

Since the engine ENG and the first motor/generator MG1 can be controlled independently at the first HEV input split mode, fuel economy and driving performance may be greatly enhanced.

Second HEV Input Split Mode

Figure 4B:
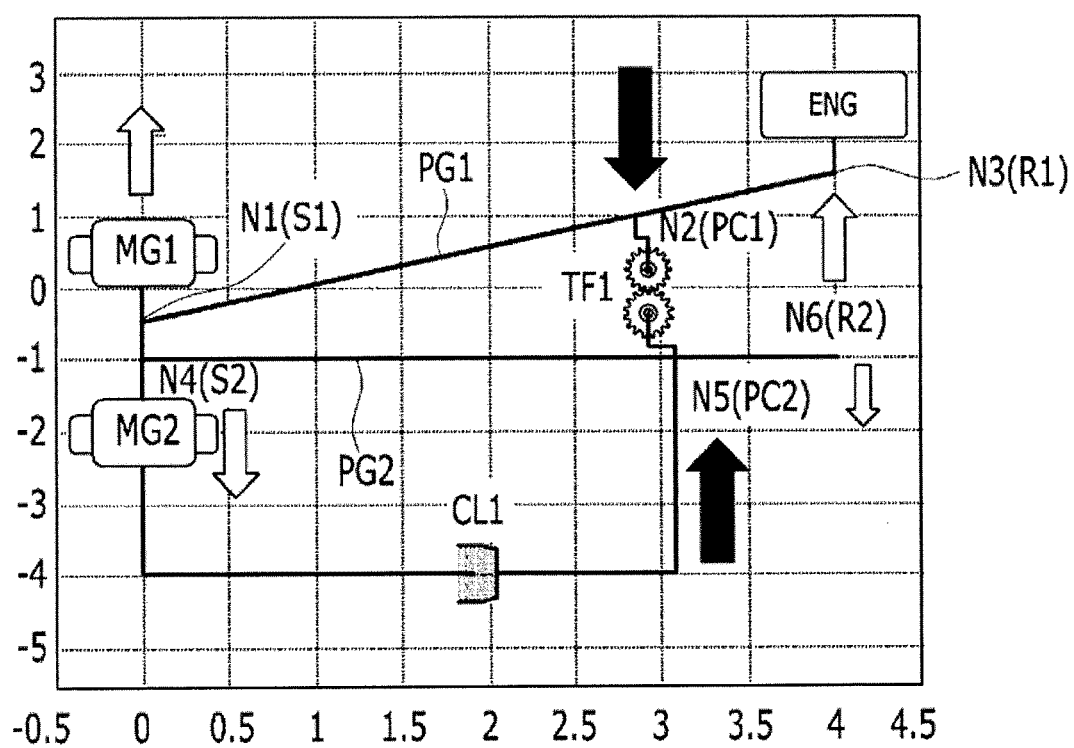
FIG. 4B is a drawing for explaining operation of an exemplary power transmission system at a second HEV input split mode according to the present invention.

FIG. 4B is a drawing for explaining operation of a power transmission system at a second HEV input split mode according to various embodiments of the present invention.

If the vehicle speed increased during the vehicle running at the first HEV input split mode, the first brake BK1 is released and the first clutch CL1 is operated so as to lower rotation speeds of all the rotation elements of the first planetary gear set PG1. Accordingly, the second HEV input split mode begins.

Since the first clutch CL1 that is the direct-coupling device of the second planetary gear set PG2 is operated, the second planetary gear set PG2 becomes a direct-coupling state. Therefore, all the rotation elements N4, N5, and N6 of the second planetary gear set PG2 rotate with the same speed.

At this time, the second rotation element N2 of the first planetary gear set PG1 and the fifth rotation element N5 of the second planetary gear set PG2 are connected to the output gear OG, but the first and third rotation elements N1 and N3 can rotate freely.

Therefore, the engine ENG and the first motor/generator MG1 can be independently controlled regardless of the vehicle speed.

In addition, the first motor/generator MG1 is operated as the generator if the first motor/generator MG1 rotates in anticlockwise, and the first motor/generator MG1 is operated as the motor if the first motor/generator MG1 rotates in clockwise (at this time, rotation speed of the engine ENG decreases).

Since the engine ENG and the first motor/generator MG1 can be controlled independently at the second HEV input split mode, fuel economy and driving performance may be greatly enhanced.

First HEV Compound Split Mode

Figure 4C:
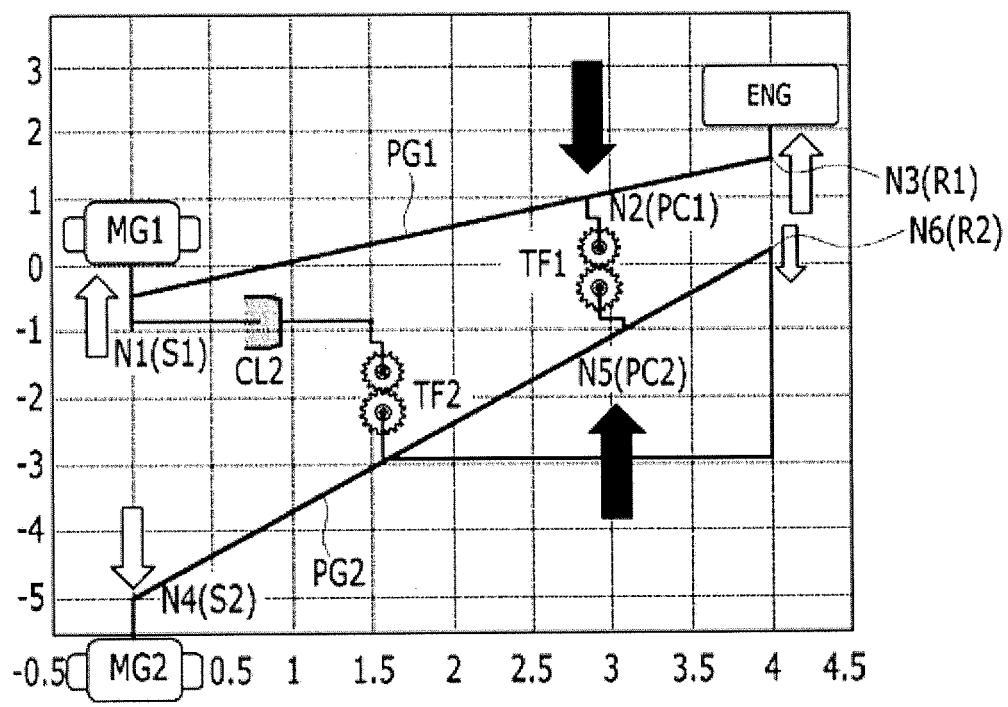
FIG. 4C is a drawing for explaining operation of an exemplary power transmission system at a first HEV compound split mode according to the present invention.

FIG. 4C is a drawing for explaining operation of a power transmission system at a first HEV compound split mode according to various embodiments of the present invention.

Since the rotation speed of the motor/generator connected to the output element is restricted to the vehicle speed, the motor/generator cannot be operated efficiently and capacity of the motor/generator is hard to be reduced at the first HEV input split mode.

Particularly, if the rotation speed of the motor/generator restricted to the vehicle speed is high due to high vehicle speed, efficiency of the motor/generator may be deteriorated and fuel economy may be hard to be optimized.

Under such conditions, two rotation elements of the first planetary gear set PG1 connected to the engine ENG and two rotation elements of the second planetary gear set PG2 are connected to each other so that the rotation speed of the engine ENG and the rotation speeds of two motor/generators MG1 and MG2 are controlled regardless the vehicle speed. Thereby, the power transmission system may be operated as an electric continuously variable transmission and may enhance fuel economy.

If the second clutch CL2 is operated, the first rotation element N1 and the sixth rotation element N6 are connected. At this time, the first rotation element N1 and the sixth rotation element N6 rotate in opposite directions with constant speed ratio by the second transfer gear TF2.

In addition, since the second rotation element N2 and the fifth rotation element N5 are connected to the output gear OG, the rotation elements of the first planetary gear set PG1 and the second planetary gear set PG2 are restricted by each other.

That is, rotation speeds and torques of the rotation elements are restricted by each other.

In addition, since electrical energy of the first and second motor/generators MG1 and MG2 should be balanced, the speeds and the torques of all the rotation elements of the first and second planetary gear sets PG1 and PG2 are correlated to each other and the power transmission system operates as the electric continuously variable transmission at the first HEV compound split mode.

Second HEV Compound Split Mode

Figure 4D:
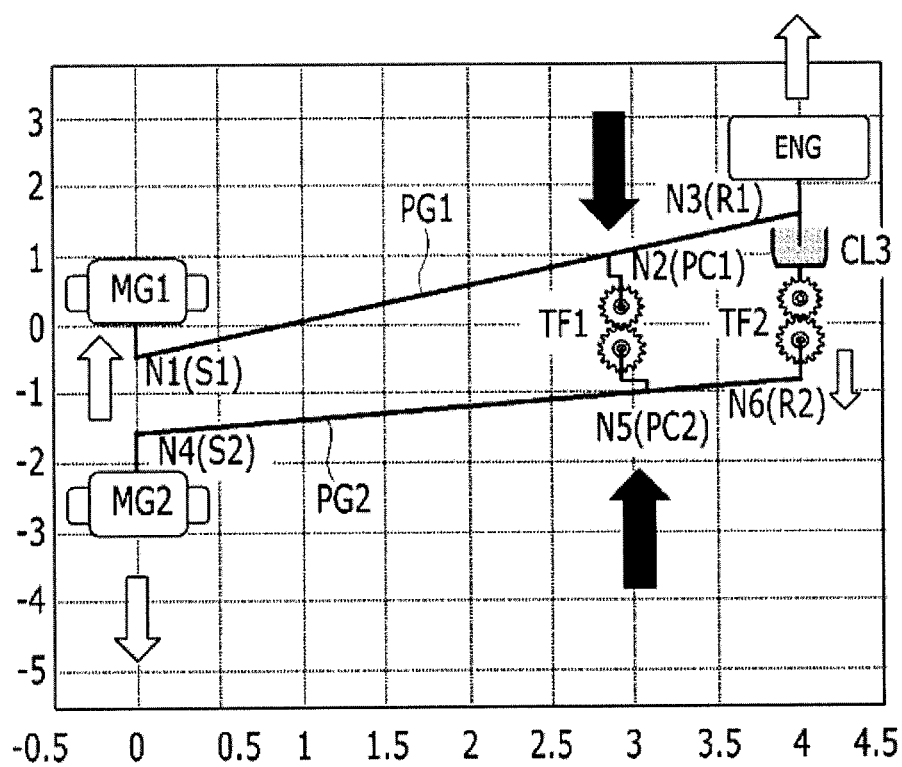
FIG. 4D is a drawing for explaining operation of an exemplary power transmission system at a second HEV compound split mode according to the present invention.

FIG. 4D is a drawing for explaining operation of a power transmission system at a second HEV compound split mode according to various embodiments of the present invention.

If the second clutch CL2 that was operated at the first HEV compound split mode is released and the third clutch CL3 is operated, the third rotation element N3 and the sixth rotation element N6 are connected. At this time, the third rotation element N3 and the sixth rotation element N6 rotate in opposite directions with constant speed ratio by the second transfer gear TF2.

Therefore, the power transmission system has different speed/torque relationships from that at the first HEV compound split mode and may be operated as an electric continuously variable transmission.

First Engine Mode

Figure 5A:
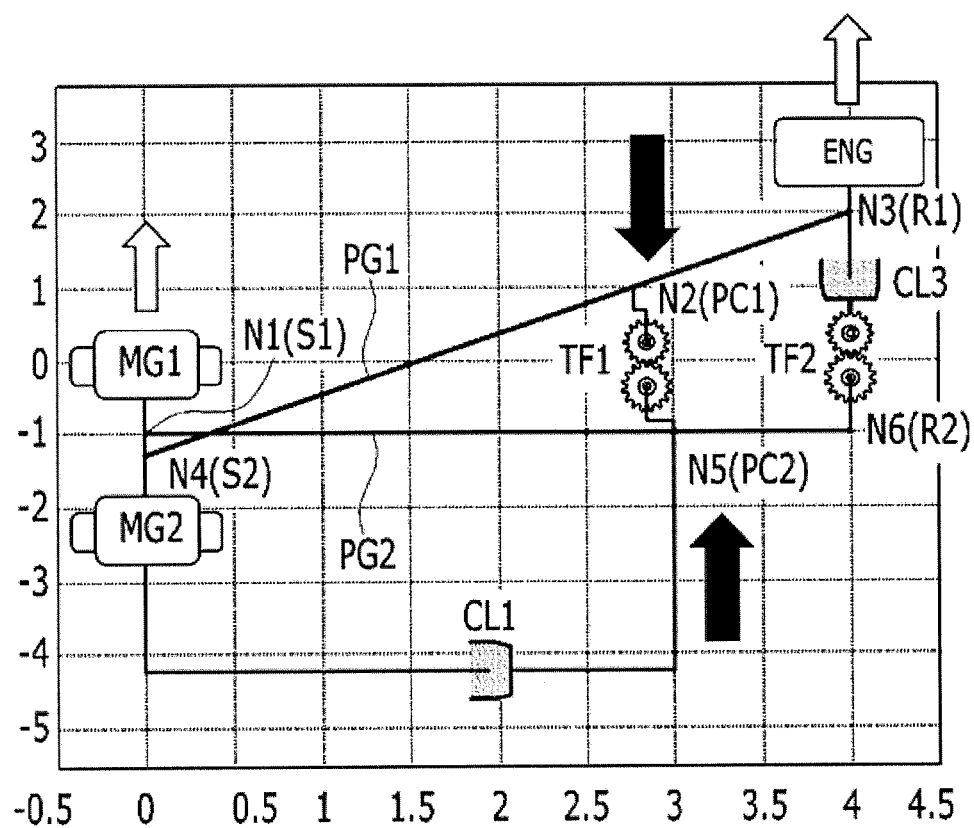
FIG. 5A is a drawing for explaining operation of an exemplary power transmission system at a first engine mode according to the present invention.

FIG. 5A is a drawing for explaining operation of a power transmission system at a first engine mode according to various embodiments of the present invention.

An important technique in the hybrid vehicle for enhancing fuel economy is recovery and reuse of brake energy and control of driving point of the engine.

In addition, controlling of the driving point of the engine accompanies conversion of mechanical energy of the engine into electric energy of the motor/generator and conversion of the electric energy of the motor/generator back into mechanical energy at the motor/generator.

During energy conversion, all input energy is not output and energy loss occurs. Fuel economy at the engine mode where the vehicle is driven only by the engine may be superior to that at the hybrid mode at any driving condition.

The first clutch CL1 and the third clutch CL3 are operated at the first engine mode. In this case, the second planetary gear set PG2 becomes the direct-coupling state by operation of the first clutch CL1 and all the rotation elements of the second planetary gear set PG2 rotate with the same rotation speed. In addition, the third rotation element N3 connected to the engine ENG rotates faster than the second rotation element N2 connected to the output shaft OS by gear ratios of the first and second transfer gears TF1 and TF2. That is, reduced speed ratio is formed at the first engine mode.

Second Engine Mode

Figure 5B:
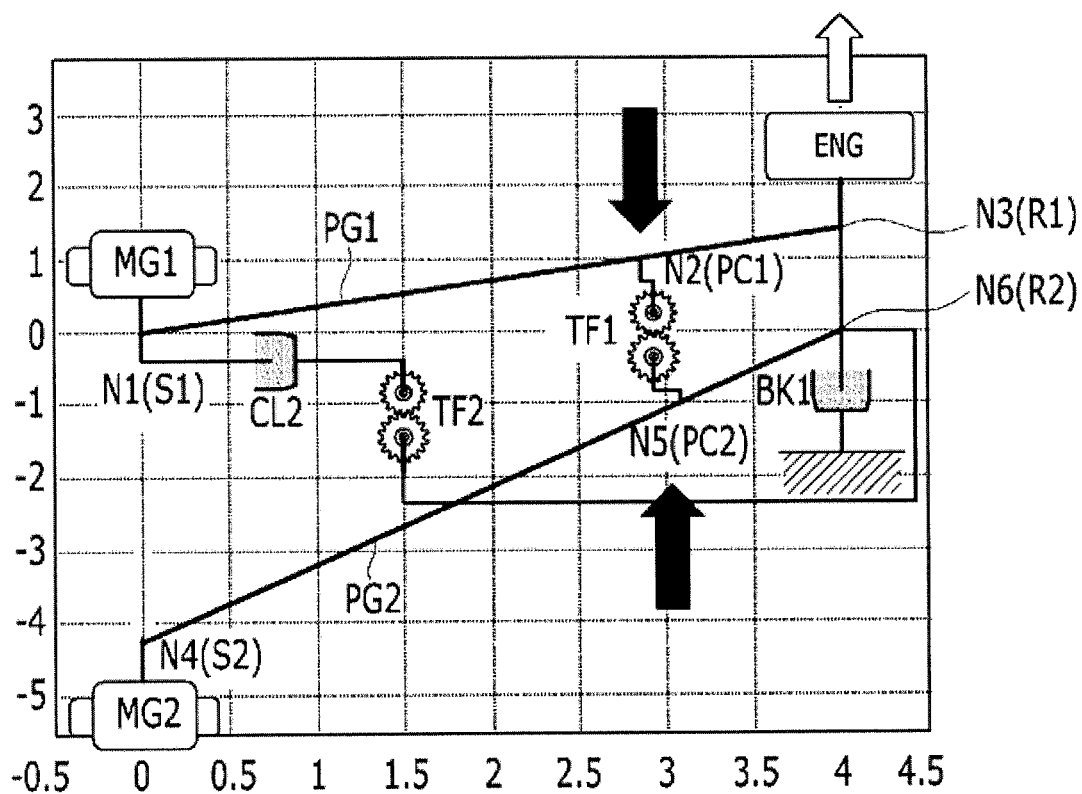
FIG. 5B is a drawing for explaining operation of an exemplary power transmission system at a second engine mode according to the present invention.

FIG. 5B is a drawing for explaining operation of a power transmission system at a second engine mode according to various embodiments of the present invention.

The second clutch CL2 and the first brake BK1 are operated at the second engine mode. In this case, the first rotation element N1 and the sixth rotation element N6 are stopped.

Therefore, the third rotation element N3 connected to the engine ENG rotates faster than the second rotation element N2 connected to the output shaft OS. That is, reduced speed ratio is formed at the second engine mode.

While the reduced speed ratio is formed by rotating the first rotation element N1 in anticlockwise direction at the first engine mode, reduced speed ratio is formed by stopping the first rotation element N1 at the second engine mode.

Third Engine Mode

Figure 5C:
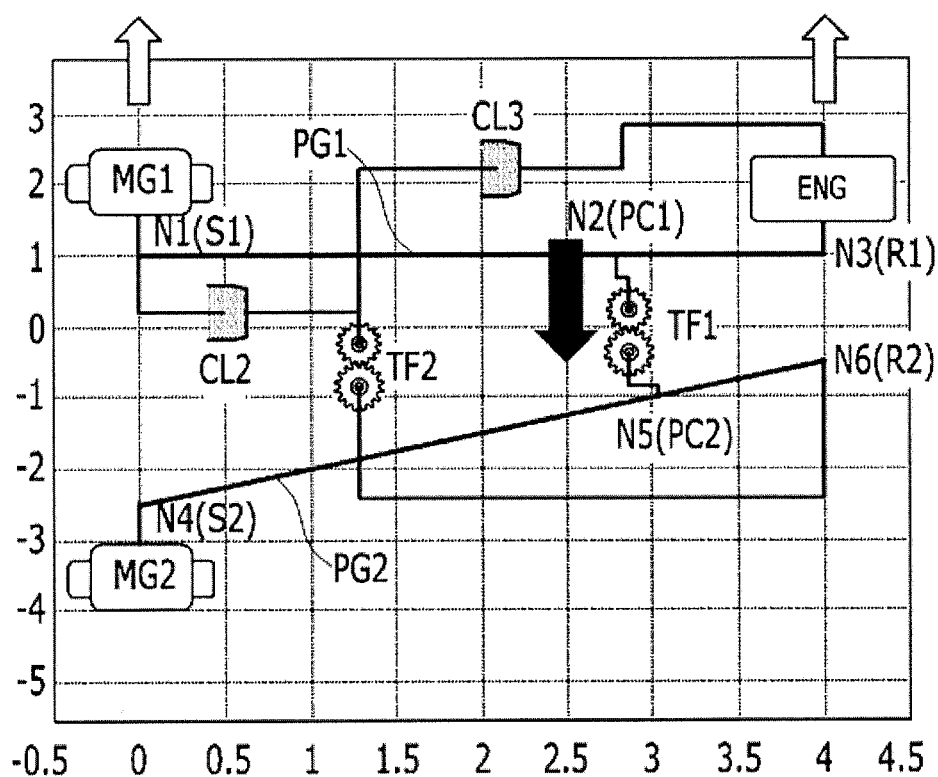
FIG. 5C is a drawing for explaining operation of an exemplary power transmission system at a third engine mode according to the present invention.

FIG. 5C is a drawing for explaining operation of a power transmission system at a third engine mode according to various embodiments of the present invention.

The second clutch CL2 and the third clutch CL3 are operated at the third engine mode. In this case, the first rotation element N1 and the third rotation element N3 are simultaneously connected to the sixth rotation element N6.

Therefore, all the rotation elements of the first planetary gear set PG1 rotate with the same rotation speed. Therefore, the rotation speed of the engine ENG is changed according to the gear ratio of the first transfer gear TF1 and the changed rotation speed is output.

Fourth Engine Mode

Figure 5D:
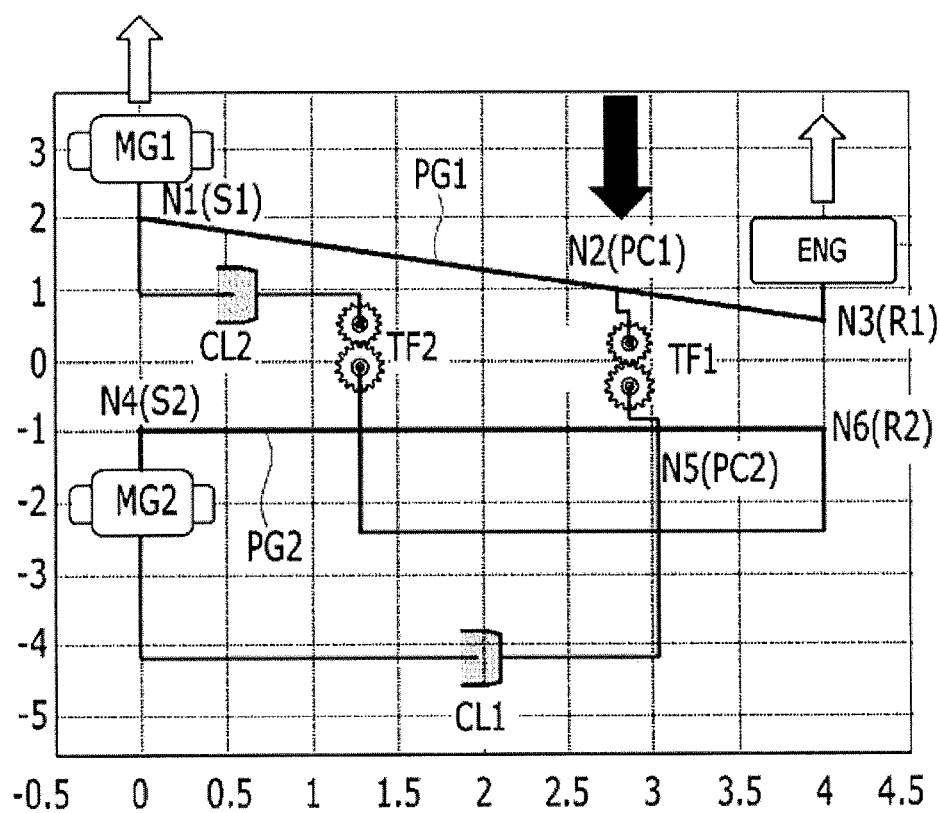
FIG. 5D is a drawing for explaining operation of an exemplary power transmission system at a fourth engine mode according to the present invention.

FIG. 5D is a drawing for explaining operation of a power transmission system at a fourth engine mode according to various embodiments of the present invention.

The first clutch CL1 and the second clutch CL2 are operated at the fourth engine mode. All the rotation elements of the second planetary gear set PG2 rotate with the same rotation speed by operation of the first clutch CL1, and the first rotation element N1 is connected to the sixth rotation element N6 through the second transfer gear TF2 by operation of the second clutch CL2.

In this case, since the first rotation element N1 rotates faster than the second rotation element N2 by the gear ratio of the second transfer gear TF2, the rotation of the output shaft OS is faster than that of the engine ENG. Therefore, overdrive speed ratio is formed.

According to various embodiments of the present invention, three EV modes, four HEV modes, and four engine modes can be achieved by combining two planetary gear sets PG1 and PG2, four frictional elements CL1, CL2, CL3, and BK1, and two motor/generators MG1 and MG2.

In addition, the electric load may be reduced and the maximum power of the engine may be used by giving more importance on mechanical power delivery path when splitting the engine power.

Since acceleration force at the HEV mode is greater than that at the engine mode, mode change to the engine mode is not necessary at the starting and a layout of the system may be simple.

In addition, the second clutch CL2 is disposed between the first rotation element N1 of the first planetary gear set PG1 and the sixth rotation element N6 of the second planetary gear set PG2 so as to freely perform mode change from the second HEV input split mode into the first HEV compound split mode according to various embodiments of the present invention. If the second clutch CL2 is operated, the engine ENG and the second motor/generator MG2 are synchronized and mode change to the first HEV compound split mode is then achieved. Therefore, mode conversion can be achieved smoothly.

Therefore, impact due to engagement of the second clutch CL2 may be suppressed and direction of torque of the first motor/generator MG1 and the second motor/generator MG2 is maintained before or after mode conversion. Therefore, controllability may be excellent.

After mode conversion is achieved, the engine is operated at its maximum power point, and the rotation speed of the second motor/generator MG2 decreases as the vehicle speed increases. Therefore, the vehicle can be driven within a drive limit range of the motor.

Since the engine mode is provided, the vehicle can run with high speed without electric load of the first and second motor/generators MG1 and MG2. Therefore, fuel economy may be improved.

Figure 6:
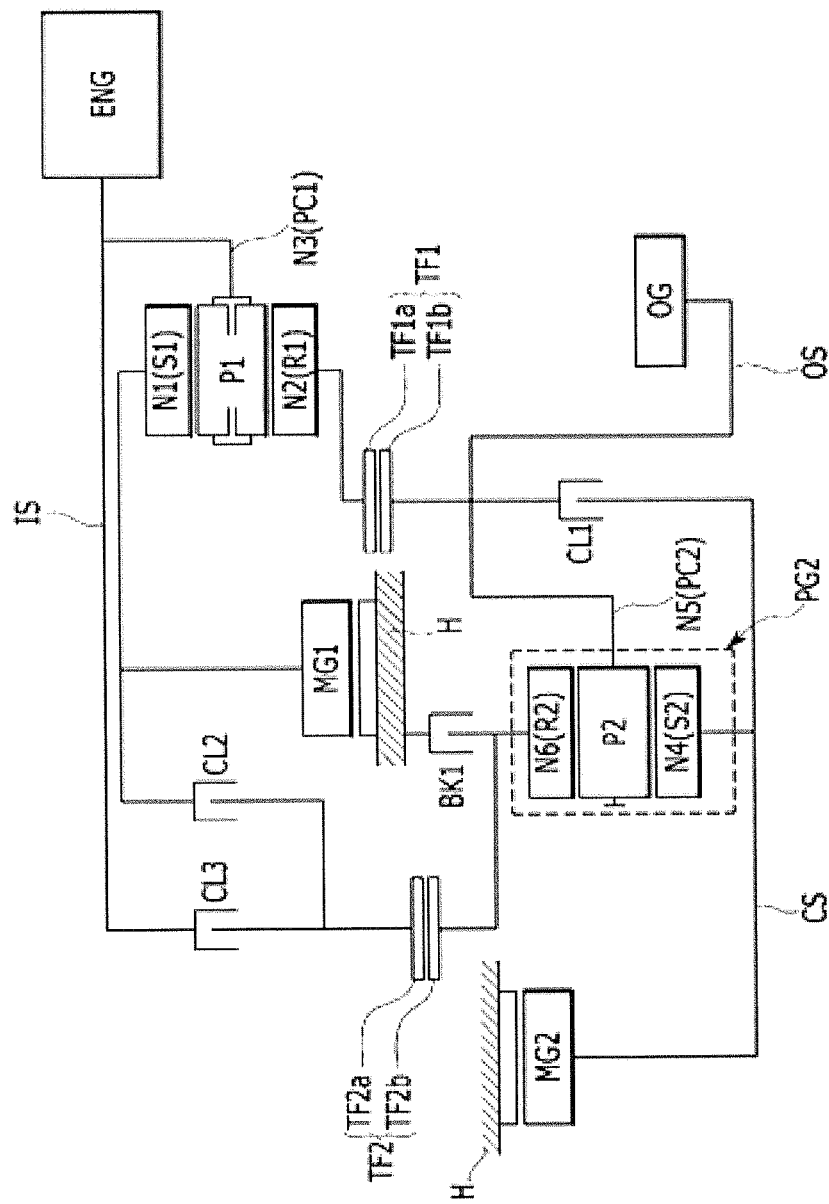
FIG. 6 is a schematic diagram of an exemplary power transmission system according to the present invention.

FIG. 6 is a schematic diagram of a power transmission system according to various embodiments of the present invention.

Referring to FIG. 6, the first planetary gear set PG1 is a single pinion planetary gear set in the exemplary embodiments described above, but the first planetary gear set PG1 may be a double pinion planetary gear set.

Therefore, the first sun gear S1 is the first rotation element N1, the first ring gear R1 is the second rotation element N2, and the first planet carrier PC1 is the third rotation element N3.

Since functions of the power transmission system of FIG. 6 are the same as the exemplary embodiments described above, except the rotation elements consisting of the second and third rotation elements N2 and N3, detailed description thereof will be omitted.

FIG. 7 is a schematic diagram of a power transmission system according to various embodiments of the present invention.

Referring to FIG. 7, both of the first planetary gear set PG1 and the second planetary gear set PG2 are single pinion planetary gear sets in the exemplary embodiments described above, but both of the first planetary gear set PG1 and the second planetary gear set PG2 may be double pinion planetary gear sets.

Therefore, the first sun gear S1 is the first rotation element N1, the first ring gear R1 is the second rotation element N2, and the first planet carrier PC1 is the third rotation element N3.

In addition, the second sun gear S2 is the fourth rotation element N4, the second ring gear R2 is the fifth rotation element N5, and the second planet carrier PC2 is the sixth rotation element N6.

Since functions of various embodiments are the same as those of the exemplary embodiments described above, except the rotation elements consisting of the second, third, fifth, and sixth rotation elements N2, N3, N5, and N6, detailed description thereof will be omitted.

According to various embodiments of the present invention, three EV modes, four HEV modes, and four engine modes can be achieved by combining two planetary gear sets, four frictional elements, and two motor/generators.

In addition, the electric load may be reduced and the maximum power of the engine may be used by giving more importance on mechanical power delivery path when splitting the engine power.

Since acceleration force at the HEV mode is greater than that at the engine mode, mode change to the engine mode is not necessary at the starting and a layout of the system may be simple.

In addition, the second clutch is disposed between the first rotation element of the first planetary gear set and the sixth rotation element of the second planetary gear set so as to freely perform mode change from the HEV input split mode into the HEV compound split mode according to various embodiments of the present invention. If the second clutch is operated, the engine and the second motor/generator are synchronized and mode change to the HEV compound split mode is then achieved. Therefore, mode conversion can be achieved smoothly.

Therefore, impact due to engagement of the second clutch may be suppressed and direction of torque of the first motor/generator and the second motor/generator is maintained before or after mode conversion. Therefore, controllability may be excellent.

After mode conversion is achieved, the engine is operated at its maximum power point, and the rotation speed of the second motor/generator decreases as the vehicle speed increases. Therefore, the vehicle can be driven within a drive limit range of the motor.

Since any one of the four engine modes is used, the vehicle can run with high speed without electric load of the first and second motor/generators MG1 and MG2. Therefore, fuel economy may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of a hybrid electric vehicle comprising:
    an engine;
    first and second motor/generators;
    an input shaft connected to and receiving torque of the engine;
    an intermediate shaft parallel with and apart from the input shaft;
    an output shaft parallel to and relatively rotatable with respect to the intermediate shaft;
    a first planetary gear set including a first rotation element connected to the first motor/generator, a second rotation element connected to the output shaft, and a third rotation element directly connected to the input shaft;
    a second planetary gear set including a fourth rotation element connected to the second motor/generator through the intermediate shaft, a fifth rotation element directly connected to the output shaft, and a sixth rotation element selectively connected to at least one of the input shaft, the first rotation element and a transmission housing;
    a first transfer gear connecting the second rotation element with the output shaft;
    a second transfer gear connecting the input shaft or the first rotation element with the sixth rotation element; and
    a first clutch selectively connecting two rotation elements among three rotation elements of the second planetary gear set.

2. The power transmission system of claim 1, wherein the first planetary gear set is a single pinion planetary gear set and includes a first sun gear being first rotation element, a first planet carrier being the second rotation element, and a first ring gear being the third rotation element, and wherein the second planetary gear set is a single pinion planetary gear set and includes a second sun gear being the fourth rotation element, a second planet carrier being the fifth rotation element, and a second ring gear being the sixth rotation element.

3. The power transmission system of claim 1, wherein the first planetary gear set is a double pinion planetary gear set and includes a first sun gear being the first rotation element, a first ring gear being the second rotation element, and a first planet carrier being the third rotation element, and wherein the second planetary gear set is a single pinion planetary gear set and includes a second sun gear being the fourth rotation element, a second planet carrier being the fifth rotation element, and a second ring gear being the sixth rotation element.

4. The power transmission system of claim 1, wherein the first planetary gear set is a double pinion planetary gear set and includes a first sun gear being the first rotation element, a first ring gear being the second rotation element, and a first planet carrier being the third rotation element, and wherein the second planetary gear set is a double pinion planetary gear set and includes a second sun gear being the fourth rotation element, a second ring gear being the fifth rotation element, and a second planet carrier being the sixth rotation element.

5. The power transmission system of claim 1, further comprising:
    a second clutch selectively connecting the first rotation element with the second transfer gear;
    a third clutch selectively connecting the input shaft with the second transfer gear; and
    a first brake selectively connecting the sixth rotation element with the transmission housing.

6. The power transmission system of claim 5, wherein
    the first brake is operated at a first electric vehicle (EV) mode,
    the first clutch is operated at a second EV mode,
    the third clutch and the first brake are operated at a quick acceleration mode of an EV mode,
    the first brake is operated at a first hybrid electric vehicle (HEV) input split mode,
    the first clutch is operated at a second HEV input split mode,
    the second clutch is operated at a first HEV compound split mode,
    the third clutch is operated at a second HEV compound split mode,
    the first clutch and the third clutch are operated at a first engine mode,
    the second clutch and the first brake are operated at a second engine mode,
    the second clutch and the third clutch are operated at a third engine mode, and
    the first clutch and the second clutch are operated at a fourth engine mode.

7. A power transmission system of a hybrid electric vehicle comprising:
    an engine;
    first and second motor/generators;
    a first planetary gear set including a first rotation element connected to the first motor/generator, a second rotation element connected to an output gear, and a third rotation element connected to the engine through an input shaft;
    a second planetary gear set including a fourth rotation element connected to the second motor/generator, a fifth rotation element connected to the output gear, and a sixth rotation element selectively connected to at least one of the input shaft, the first rotation element and a transmission housing;

a first transfer gear connecting the second rotation element with the output gear;

a second transfer gear connecting the input shaft or the first rotation element to the sixth rotation element;

a first clutch adapted to selectively couple at least two of the fourth, fifth, and sixth rotational elements of the second planetary gear set;

a second clutch selectively connecting the first rotation element with the second transfer gear;

a third clutch selectively connecting the input shaft with the second transfer gear; and a first brake selectively connecting the sixth rotation element with the transmission housing.

8. The power transmission system of claim 7, wherein the first planetary gear set is a single pinion planetary gear set and includes a first sun gear being first rotation element, a first planet carrier being the second rotation element, and a first ring gear being the third rotation element, and wherein the second planetary gear set is a single pinion planetary gear set and includes a second sun gear being the fourth rotation element, a second planet carrier being the fifth rotation element, and a second ring gear being the sixth rotation element.

9. The power transmission system of claim 7, wherein the first planetary gear set is a double pinion planetary gear set and includes a first sun gear being the first rotation element, a first ring gear being the second rotation element, and a first planet carrier being the third rotation element, and wherein the second planetary gear set is a single pinion planetary gear set and includes a second sun gear being the fourth rotation element, a second planet carrier being the fifth rotation element, and a second ring gear being the sixth rotation element.

10. The power transmission system of claim 9, wherein the first clutch is interposed between the second sun gear and the second ring gear.

11. The power transmission system of claim 7, wherein the first planetary gear set is a double pinion planetary gear set and includes a first sun gear being the first rotation element, a first ring gear being the second rotation element, and a first planet carrier being the third rotation element, and wherein the second planetary gear set is a double pinion planetary gear set and includes a second sun gear being the fourth rotation element, a second ring gear being the fifth rotation element, and a second planet carrier being the sixth rotation element.

12. The power transmission system of claim 7, wherein the first clutch is interposed between the fourth rotation element and the fifth rotation element.

13. The power transmission system of claim 8, wherein the first clutch is interposed between the second sun gear and the second planet carrier.

* * * * *